United States Patent [19]
Elsing

[11] Patent Number: 5,856,624
[45] Date of Patent: Jan. 5, 1999

[54] METHOD AND APPARATUS FOR TESTING A SPINDLE IN A DISC DRIVE

[75] Inventor: John W. Elsing, Edina, Minn.

[73] Assignee: Seagate Technology, Inc., Scotts Valley, Calif.

[21] Appl. No.: 904,201

[22] Filed: Jul. 31, 1997

Related U.S. Application Data

[60] Provisional application No. 60/048,530 Jun. 3, 1997.

[51] Int. Cl.[6] .................................................. G01B 7/12

[52] U.S. Cl. ................................. 73/865.9; 33/517

[58] Field of Search .......................... 73/9, 865.3, 865.6, 73/865.9; 33/517; 324/207.22

[56] References Cited

U.S. PATENT DOCUMENTS

| | | |
|---|---|---|
| 3,146,528 | 9/1964 | Goulet et al. .............................. 33/517 |
| 4,347,667 | 9/1982 | Albertazzi . | |

Primary Examiner—Robert Raevis
Attorney, Agent, or Firm—Westman, Champlin & Kelly, P.A.

[57] ABSTRACT

A method and apparatus are used for testing a spindle which is used to support a disc pack for rotation in a disc drive. The test apparatus is removably coupled to the spindle. The current apparatus defines a test surface and has an outer periphery greater than an outer periphery of the spindle. A measurement device is placed proximate the test surface at a location radially displaced from the spindle. A distance between the test surface and the measuring device is measured with a measuring device during rotation of the spindle and the test apparatus.

8 Claims, 7 Drawing Sheets

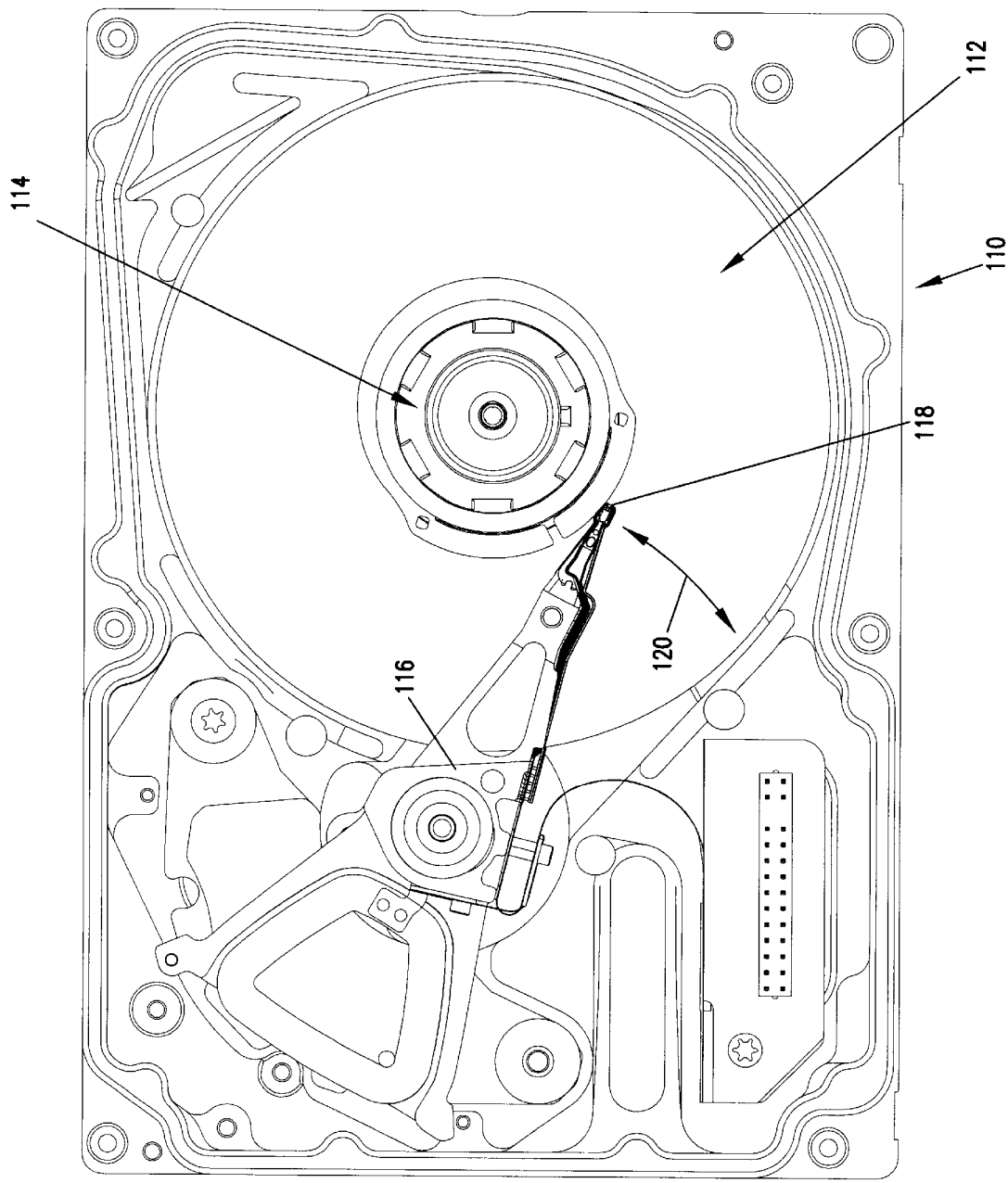

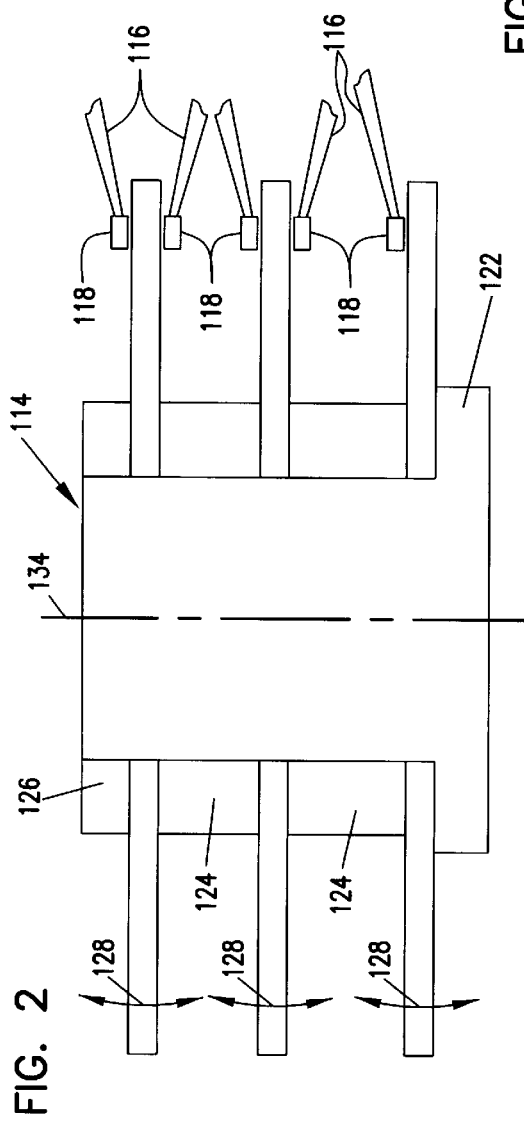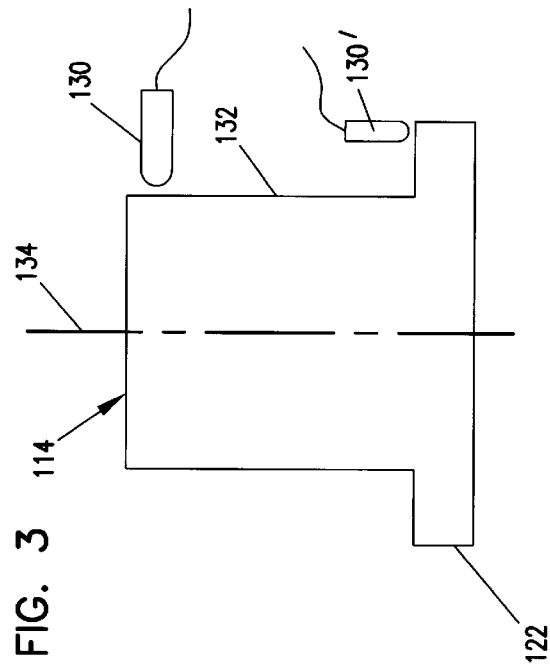

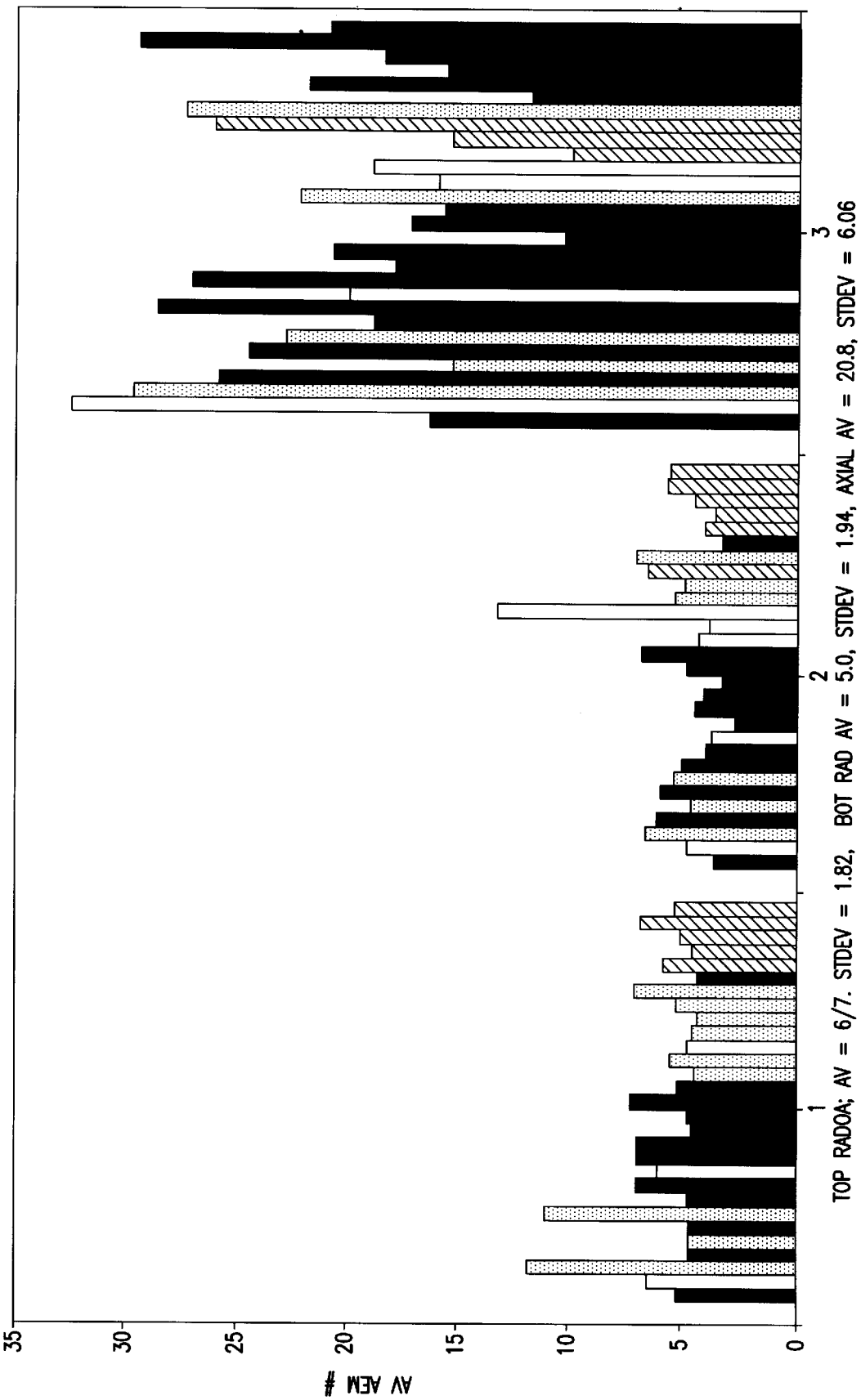

5,856,624

METHOD AND APPARATUS FOR TESTING A SPINDLE IN A DISC DRIVE

REFERENCE TO RELATED APPLICATION

The present application is based on a provisional application Ser. No. 60/048,530 filed on Jun. 3, 1997.

FIELD OF THE INVENTION

The present invention relates to disc drives. More particularly, the present invention relates to method and apparatus for testing a spindle in a disc drive.

BACKGROUND OF THE INVENTION

A typical disc drive includes one or more magnetic discs mounted for rotation on a hub or spindle. A typical disc drive also includes a transducer supported by a hydrodynamic air bearing which flies above each magnetic disc. The transducer and the hydrodynamic air bearing are collectively referred to as a data head. A drive controller is conventionally used for controlling the disc drive based on commands received from a host system. The drive controller controls the disc drive to retrieve information from the magnetic discs and to store information on the magnetic discs.

An electromechanical actuator operates within a negative feedback, closed-loop servo system. The actuator moves the data head radially over the disc surface for track seek operations and holds the transducer directly over a track on the disc surface for track following operations.

The spindle which supports the discs for rotation is driven by a spindle motor. The spindle is supported by bearings and typically has an annular flange thereabout. The discs are placed concentrically over the spindle, and are spaced apart axially along the spindle by annular spacer members.

Discs are conventionally fastened to the spindle using a shrinkable clamp member. Once the discs and spacers are assembled on the spindle, the clamp is heated and placed over the spindle and then allowed to cool and shrink such that it frictionally engages the outer periphery of the spindle to clamp the discs to the spindle. Prior to the clamping member becoming fixedly attached to the spindle, the discs are subjected to an axial preload force. Once the clamp becomes fixedly attached to the spindle, the preload force acts to fix the discs to the spindle for concentric rotation with the spindle.

In recent years, the storage capacity of discs has increased dramatically. One aspect of increasing the storage capacity is to increase the tracks per radial inch or tracks per inch (TPI) on the disc.

Runout (both repeatable and non-repeatable runout) associated with the bearing supporting the spindle can cause the discs supported by the spindle to wobble or exhibit displacement in the axial direction during rotation. In drives where the TPI is very high, this wobble or displacement can cause a disc to move relative to the data head by a distance which constitutes a large percent of a track width, or in some instances more than a track width. This can cause errors in writing data to the disc, or reading data from the disc.

The present invention provides a solution to this and other problems, and offers other advantages over the prior art.

SUMMARY OF THE INVENTION

A method and apparatus are used for testing a spindle which is used to support a disc pack for rotation in a disc drive. A test apparatus is removably coupled to the spindle. The current apparatus defines a test surface and has an outer periphery greater than an outer periphery of the spindle. A measurement device is placed proximate the test surface at a location radially displaced from the spindle. A distance between the test surface and the measuring device is measured with a measuring device during rotation of the spindle and the test apparatus.

BRIEF DESCRIPTION OF THE DRAWINGS

FIG. 1 is a top view of a portion of a disc drive.

FIG. 2 is a side view of a portion of a disc drive illustrating the effects of bearing runout.

FIG. 3 illustrates a method of measuring a rotational characteristic of a spindle in a disc drive in accordance with the prior art.

FIG. 8 is a graph illustrating displacement as shown in FIG. 7, except that it is in the time domain.

DETAILED DESCRIPTION OF THE PREFERRED EMBODIMENTS

Figure 4:
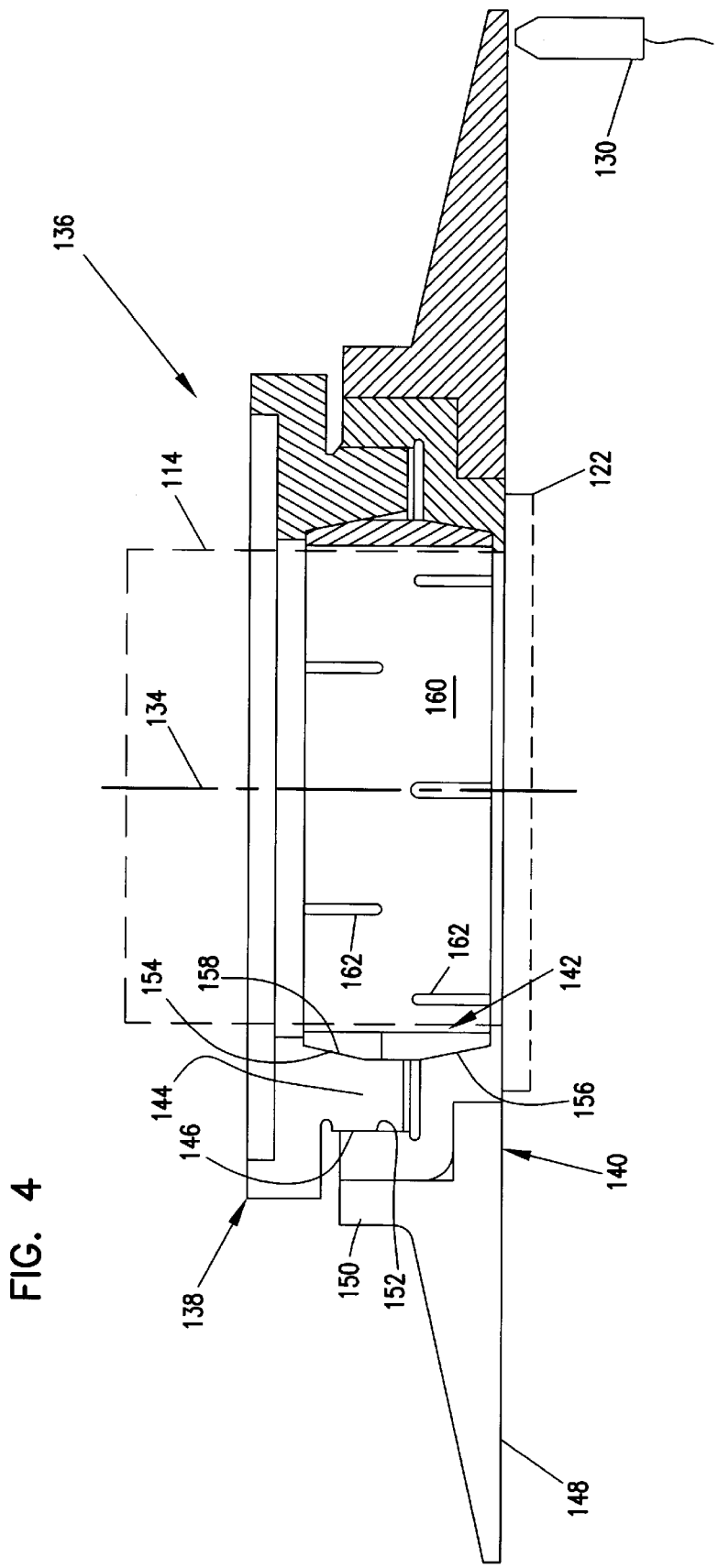
FIG. 4 is a cross-section of a system used in measuring a rotation characteristic of a spindle in accordance with the present invention.

FIG. 1 illustrates a top view of a portion of a disc drive 110. Disc drive 110 includes at least one disc 112 supported for rotation with a concentrically located spindle 114. Disc drive 110 also includes an actuator arm 116 which supports a data head 118. Data head 118 typically includes a hydrodynamic air bearing which supports a transducer such that the transducer flies above concentrically arranged tracks on the surface of the disc drive to encode flux reversals on the tracks, or read flux reversals from the tracks. An electromechanical actuator (not shown) moves actuator arm 116 radially with respect to disc 112 generally about an arc illustrated by arrow 120 during a track seek operation, and holds data head 118 over a track on the surface of disc 112 for a track following operation.

FIG. 2 is a side view of a portion of disc drive 110 shown in FIG. 1. FIG. 2 illustrates that disc drive 110 has a plurality of discs 112, each having an associated data head 118 and an actuator arm 116. FIG. 2 also illustrates that discs 112 are supported on an annular flange 122 of spindle 114 by annular spacer rings 124, and heat shrink clamp 126.

Spindle 114 is typically supported for rotation at an upper axial end and a lower axial end by a pair of bearings (not shown). Bearings typically have associated repeatable runout which is the same for each rotation of spindle 114, and non-repeatable runout, which changes at different frequencies of rotation. The non-repeatable runout is due to a number of factors, including harmonics in the system, the mass of various components in the system, and the runout characteristics of the various components, at different frequencies. Therefore, during rotation of spindle 114, the spindle wobbles thus causing axial and radial displacement of discs 112 generally along arcs 128. FIG. 2 illustrates that this type of wobbling can cause the tracks on the surfaces of discs 112 to move radially inwardly and outwardly, and axially upwardly and downwardly, relative to data heads 118 associated therewith.

Repeatable runout is not typically problematic in such disc drives 110, because the servo actuator typically has high enough resolution and bandwidth that it can follow repeatable runout. However, the actuator system may not be able to follow non-repeatable runout. Thus, non-repeatable runout for spindle 114 is preferably measured and characterized prior to implementation in a disc drive such that spindles with non-repeatable runout that exceeds a given threshold can be discarded. In any case, it is preferable that the non-repeatable runout be at least measured prior to implementing the spindle 114 into a disc drive.

FIG. 3 illustrates two prior methods which have been used in an attempt to measure and characterize, or at least measure, non-repeatable runout. In accordance with one method, measurement device 130 is placed adjacent the outer periphery of the upper portion of spindle 114. Measurement device 130 is used to measure a distance between the tip of measurement device 130 and the outer periphery (or surface) 132 of spindle 114. In one preferred embodiment, measurement device 130 is a capacitance probe, or other similar, commercially available, measurement device suitable for this purpose.

FIG. 3 also illustrates another system in accordance with the prior art, which has been used to measure rotational characteristics of spindle 114. Capacitance probe 130' has also been placed adjacent an outer region of annular rim 122, as illustrated by probe 130'. In that embodiment, as spindle 114 wobbles during rotation, the amplitude of the displacement relative to capacitance probe 130' is amplified over that with respect to capacitance probe 130. This is because capacitance probe 130' is measuring displacement generally in the axial direction, and also because capacitance probe 130' is displaced from an axis of rotation 134', in the radial direction, further than capacitance probe 130.

However, in accordance with either system illustrated by FIG. 3, the amplitude of displacement of the surface of spindle 114 relative to capacitance probes 130 or 130' is so small that it can hardly be detected given the accuracy of the measurement equipment. Further, the non-repeatable runout, even if it can be measured in accordance with one of the systems illustrated by FIG. 3, may not be an accurate reflection of that which actually occurs under operating conditions. Since the mass of the rotating system changes once a disc pack (such as that shown in FIG. 2) has been assembled to spindle 114, measuring non-repeatable runout of an unloaded spindle may introduce inaccuracies into the system.

FIG. 4 is a partial cross-sectional view of an apparatus 136 used for measuring a rotational characteristic of spindle 114 (shown in phantom) in accordance with the present invention. Apparatus 136 includes upper member 138, lower member 140, and internal sleeve 142. In one preferred embodiment, upper member 138 has a lower portion 144 which has a threaded outer surface 146. Lower member 140 defines a bottom, flat surface 148 and has an upwardly extending annular portion 150 which has a threaded inner surface 152. Threaded inner surface 152 is designed to threadably mate with, or engage, threaded outer surface 146 of upper member 138.

Inner peripheries 154 and 156 of upper member 138 and lower member 140, respectively, define a generally conical bore. Sleeve 142 fits within the generally conical board defined by internal peripheral surfaces 154 and 156. Internal sleeve 142 has an outer surface 158 and an inner surface 160. Outer surface 158 engages the inner peripheral surfaces 154 and 156 of members 138 and 140, while the inner surface 160 engages the exterior periphery of hub 114 (shown in greater detail in FIG. 5).

FIG. 4 also illustrates measurement device 130 spaced closely proximate the lower surface 148 for measuring the displacement of surface 148 relative to device 130. FIG. 4 clearly illustrates that device 130 is displaced significantly further from the axis of rotation 134 then was device 130' shown in FIG. 3. Thus, the amplitude of the measured displacement caused by non-repeatable runout, or other rotating characteristics of spindle 114, will be much higher, and thus much more easily detected and measured with the placement of measurement device 130 shown in FIG. 4, that with either of the two prior art methods of measuring such rotational characteristics of spindle 114. This is graphically illustrated with respect to FIGS. 6–8 discussed in greater detail below.

In operation, apparatus 136 is mounted over the outer periphery of spindle 114. This is done by rotating upper member 138, preferably in the counter clockwise direction, to unscrew threaded surface 146 from threaded surface 152, or at least unscrew upper portion 138 from lower portion 140 to a desired extent. Then, apparatus 136 is mounted over spindle 114 such that the outer periphery of spindle 114 resides within the axial bore defined by the inner surface 160 of sleeve 142. Apparatus 136 is preferably positioned on spindle 114 such that the lower surface 148 abuts against, or is adjacent, the upper surface of annular flange 122 of spindle 114.

Apparatus 136 is then fastened to the outer peripheral surface of spindle 114. In the preferred embodiment, inner surfaces 154 and 156 of members 138 and 140 are disposed at an angle relative to the outer surface 158 of sleeve 142. In order to fasten apparatus 136 to spindle 114, upper member 138 is preferably rotated in the clockwise direction relative to lower member 140. This causes threaded surface 146 and 152 to interact with one another so as to draw upper member 138 and lower member 140 closer relative to one another.

Sleeve 142 is preferably formed of a pliable, or resilient material, such as Delrin, or another suitable material. Sleeve 142 preferably will not mar or mark spindle 114. Also, sleeve 142 preferably has a plurality of notches or channels 162 formed therein. Thus, as members 138 and 140 move more closely relative to one another, inclined surfaces 154 and 156 act to exert a compressive force, directed radially inwardly, on the outer surfaces 158 of sleeve 142. Because sleeve 142 is formed of a resilient material, and because sleeve 142 has notches 162 formed therein, inward force applied by members 138 and 140 cause sleeve 142 to tighten around the external periphery of spindle 114, thereby securing apparatus 136 to spindle 114.

Figure 5:
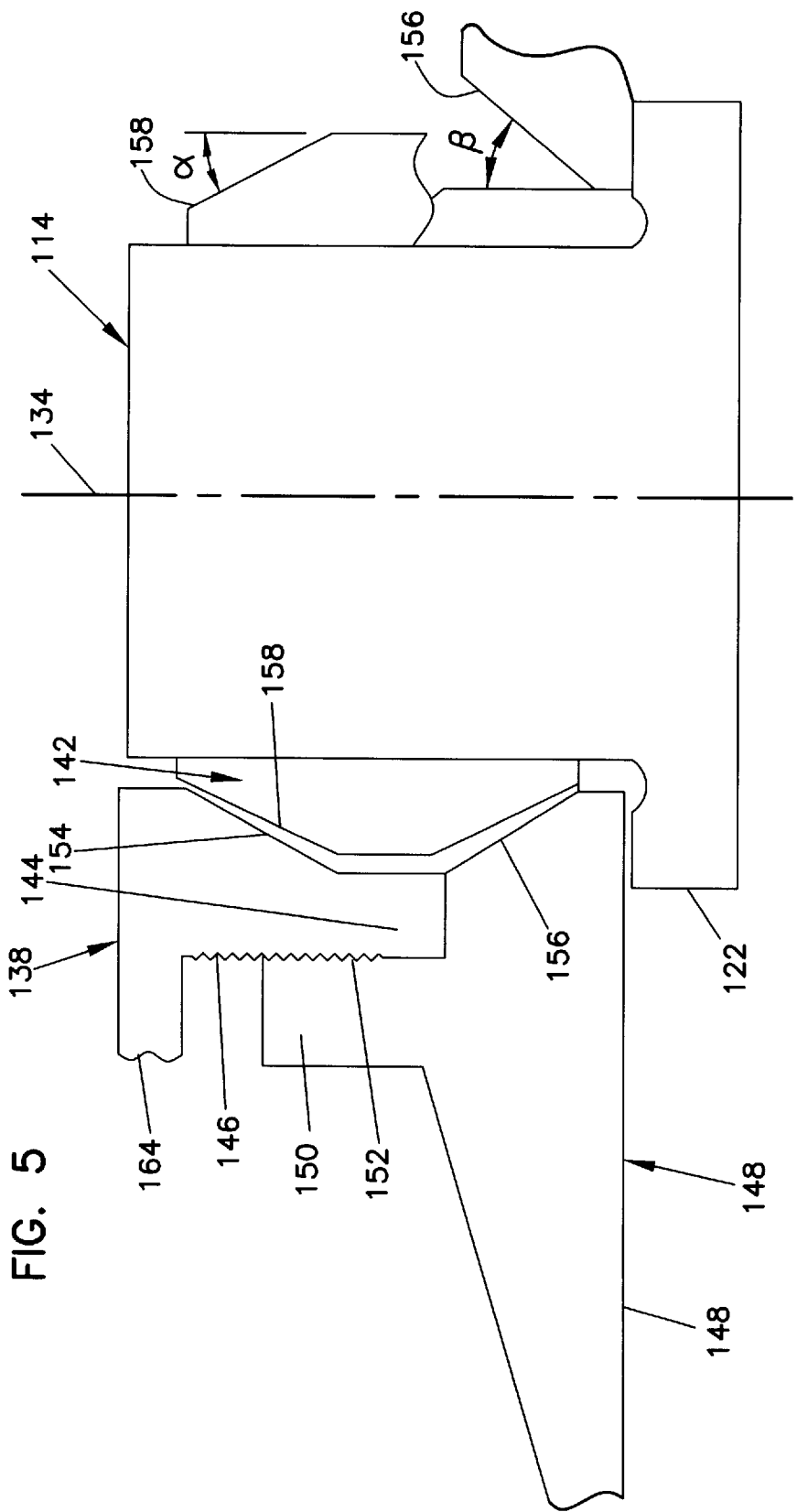
FIG. 5 is an enlarged partial sectional view of the system shown in FIG. 4.

FIG. 5 is a greatly enlarged view of a portion of apparatus 136 shown assembled on spindle 114. FIG. 5 illustrates that, in one preferred embodiment, the angle of the outer surface 158 of sleeve 142, relative to the angle of inner surfaces 154 and 156 of upper and lower members 138 and 140, respectively, are formed such that the surfaces are non-parallel. In other words, in one preferred embodiment, the inner surfaces 154 and 156 are disposed at an angle $\beta$ relative to axis 134. Also, in one preferred embodiment, the outer inclined surfaces 158 of sleeve 142 are disposed at an angle a relative to axis 134. In a preferred embodiment, $\alpha$ and $\beta$ are not equal to one another. In an even more preferred embodiment, $\alpha$ is less than $\beta$.

This gives rise to the arrangement shown in FIG. 5 in which the outer surface 158 of sleeve 142 is first contacted by the inner surface 154 of upper member 138, at a top or upper region of sleeve 142. Also, the lower inclined surface 158 of sleeve 142 is first contacted by the inner surface 156 at a lower portion of sleeve 142. Therefore, as members 138 and 140 are brought closer to one another, the force on the axially spaced upper and lower regions or portions of sleeve 142 is the greatest. Thus, tighter contact with spindle 114 is formed at those two points, rather than at a center region along sleeve 142. In this way, two axially spaced portions make tight contact with spindle 114 to secure apparatus 136 to spindle 114.

Also, in one preferred embodiment, α is approximately equal to 10° while β is approximately equal to 11°. This one degree difference places the radially inwardly directed compressive forces at the upper and lower portions of sleeve 142.

This is the preferred embodiment because, if angles α and β were exactly equal to one another, manufacturing tolerances would dictate that the region where the tightest contact between sleeve 142 and spindle 114 occur, would be, to some extent, unpredictable. Also, such tight contact may only be formed at one point along the outer surface of spindle 114. That being the case, sleeve 142 could rock or wobble about that point relative to the outer surface of spindle 114. This would introduce undesirable dynamic characteristics into the system.

FIG. 5 also illustrates that, in the preferred embodiment, upper member 138 has an outer surface portion 164 which is rough, or knurled. This is provided in order to assist in the rotation of member 138 relative to member 140.

Also, in the preferred embodiment, threaded surfaces 146 and 152 are preferably provided with relatively fine threads to develop a high connection force between apparatus 136 and spindle 114. In one preferred embodiment, the threaded surfaces are provided with approximately 64 threads per inch.

Further, the fixture preferably rests axially on the top surface of spindle flange 122 in the same way the discs mount, taking on the correct attitude for simulation. In addition, the fixture preferably mounts to the spindle, comprising sleeve 142 in a radially uniform manner such as to the self-centering so that out of balance forces are controlled and reduced.

Further, in the preferred embodiment, lower surface 148 is a lapped surface such that it is very smooth. In this way, measurement device 130 can actively measure displacement. It will be noted that, in one preferred embodiment, measurement device 130, as used with the present apparatus 136, can possibly be placed a distance of 2.5 inches, or more, from axis of rotation 134. This greatly enhances the amplitude of the displacement measured by measuring device 130.

Also, in a preferred embodiment, apparatus 136 approximates the mass of a disc pack which will eventually be assembled onto spindle 114. Thus, in one preferred embodiment, apparatus 136 has a weight of approximately 82 grams. This is approximately the same weight as five discs, four disc spacers, and a clamp.

Of course, the weight and configuration of apparatus 136 may change, depending upon the type of disc pack simulated, and depending upon the type of spindle used.

Figure 6:
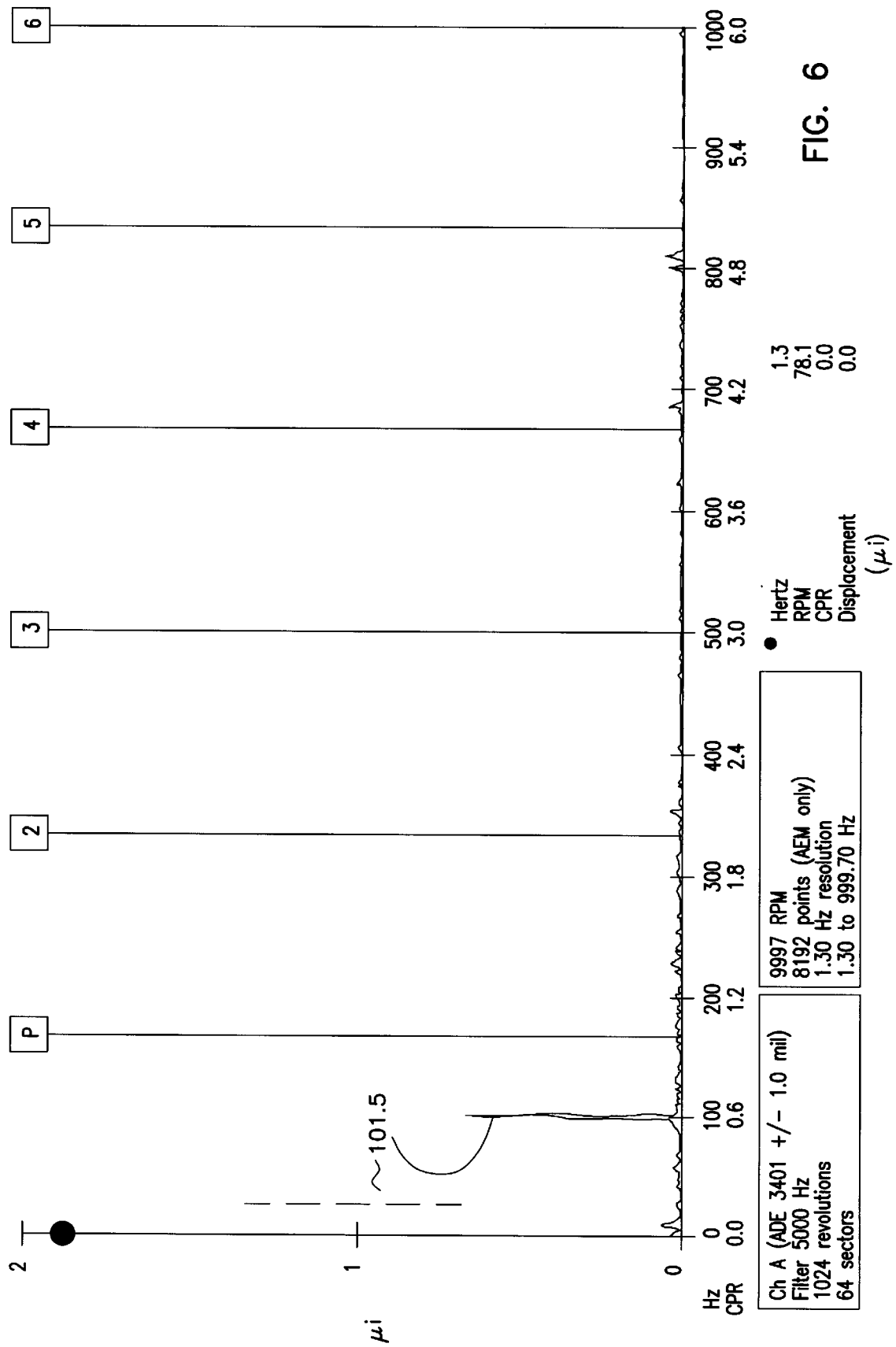
FIG. 6 is a plot of the measured displacement in the frequency domain measured with a prior art system.

FIG. 6 is a plot of measured displacement using a capacitance probe arranged such as capacitance probe 130' shown in FIG. 3. The graph in FIG. 6 plots microinches of displacement (along the y axis) against the frequency of rotation (along the x axis). The graph of FIG. 6 illustrates one displacement spike at approximately 101.5 hertz. That displacement spike appears at the cage frequency (i.e., the frequency associated with runout attributed to the bearing cage) Although the remainder of the graph illustrates some small displacements, they are essentially too small to be measured, and can be attributed to noise.

Figure 7:
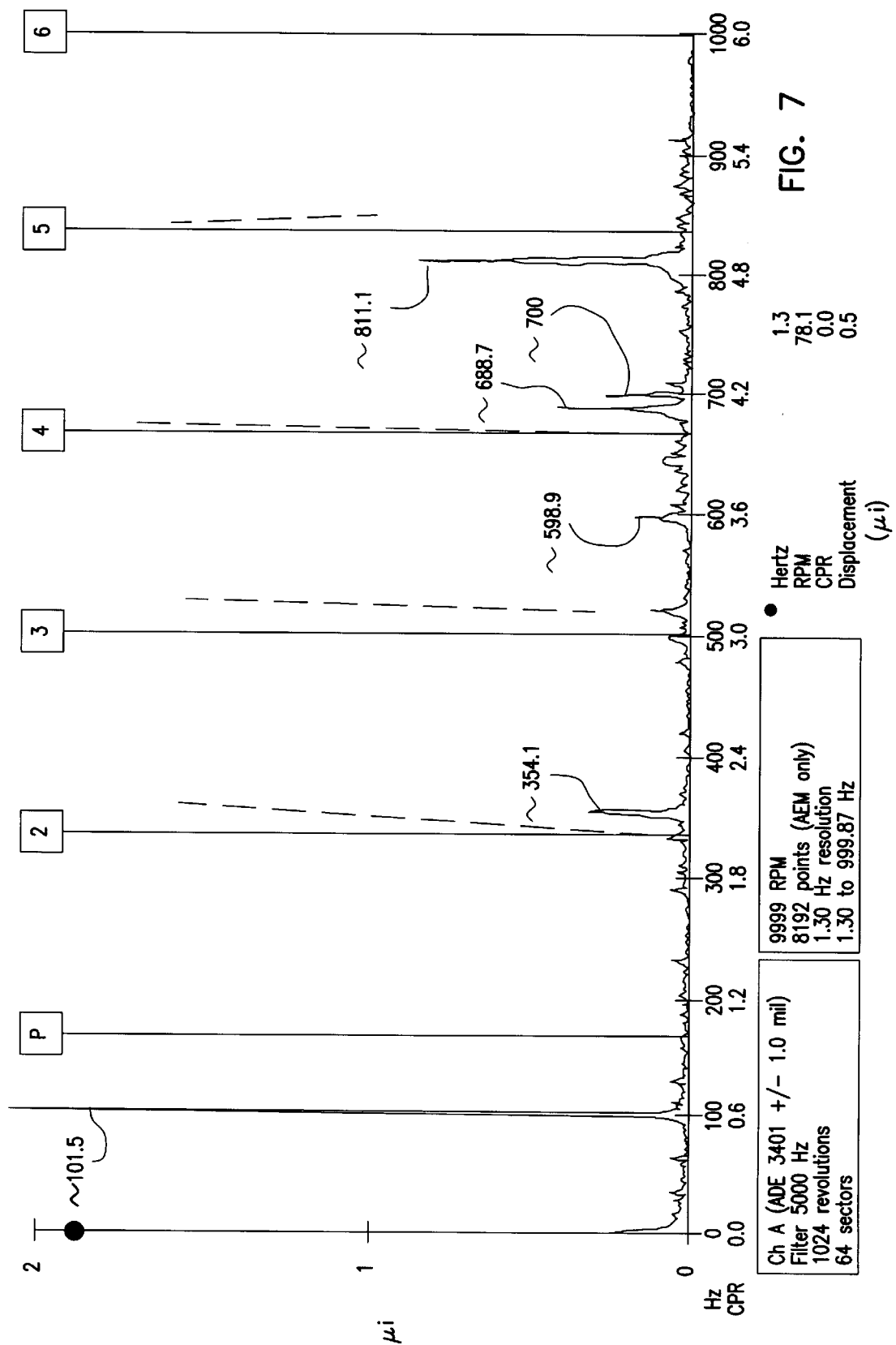
FIG. 7 is a plot of the measured displacement in the frequency domain measured with a system in accordance with the present invention.

By contrast, FIG. 7 illustrates a similar graph using the measurement technique in accordance with the present invention. It can be seen that the amplitude of all of the displacements measured on the graph are greatly increased when using the method according to the present invention. As shown in FIG. 7, the displacement associated with the cage frequency is approximately several times larger than that illustrated in FIG. 6.

Also, utilizing the technique according to the present invention, many other displacements associated with other frequency components, and other components of the disc drive, can be measured and characterized. For example, at approximately 354.1 Hertz (Hz), a displacement can be measured which is associated with the radial first order outer bearing race. Further, at approximately 598.9 Hz, a displacement is observed which is associated with the balls. At approximately 688.7 Hz, approximately 700.4 Hz, and approximately 811 Hz, other displacements are also observed, associated with the outer race, balls, and the inner race respectively. None of these displacements were detectable, or measurable, using the prior art techniques. Thus, the present invention can be utilized in characterizing and measuring displacements far more accurately than prior art techniques.

FIG. 8 illustrates substantially the same information shown in FIGS. 6 and 7, but in the time domain, and for a plurality of spindles. Each vertical bar on the graph of FIG. 8 is associated with one spindle. The left most grouping of vertical bars in FIG. 8 illustrates displacement measurements taken for a radial arrangement of measuring device 130, at the upper portion of the spindle, such as measurement device 130 shown in FIG. 3. The center grouping of vertical bars illustrates measurements taken using measurement device 130' as placed at a lower portion of the spindle in FIG. 3. The right most grouping of vertical bars illustrates measurements taken wherein measurement device 130 is placed proximate lower surface 148 of apparatus 136 (as in FIG. 4) in accordance with the present invention.

FIG. 8 illustrates that the present invention can be used in implementing a test procedure, or screening process, for spindles during manufacturing. A threshold level is first set for any, or each, of the measurements illustrated in FIG. 8. If the measurements for any spindle crosses the threshold level, that spindle is then discarded as unsuitable for implementation in a disc drive. By contrast, if all measurements for a given spindle are within the threshold level, that spindle is then implemented in a disc drive. Further, the spindles can be graded in accordance with the present invention, by setting multiple threshold levels, and determining whether the measurements for any spindle are within one or more of the multiple threshold levels. If so, the spindles can be graded accordingly, and used in higher or lower performance disc drives.

Thus, the present invention provides significant advantages over techniques of the prior art. The present invention provides a technique which is much more sensitive to runout or other rotational characteristics of the spindles, and can measure them and characterize them much more accurately. In addition, since the apparatus according to the present invention simulates a load applied by a conventional disc pack, the measurements taken in accordance with the present invention are more meaningful, because they will be more similar to those which take place when the spindle is actually loaded with a disc pack.

The present invention includes a method and apparatus for testing a spindle 114 used to support a disc pack for rotation in a disc drive 110. The test apparatus 136 is removably coupled to the spindle 114 and defines a test surface. The test apparatus 136 has an outer periphery greater than the outer periphery of the spindle 114. A measurement device 130 is placed proximate the test surface at a location radially displaced from the outer periphery of the spindle 114. A distance between the measurement device 130 and the test surface is measured with the measurement device 130 during rotation of the spindle 114.

The tested spindles can then be sorted or screened based on those measurements.

Also, measuring the distance, in accordance with one aspect of the present invention, comprises measuring the distance between the measurement device 130 and the test surface at various frequencies of rotation of the spindle 114, and recording the distances and the frequencies.

Removably coupling the test apparatus 136 to the spindle 114 in one embodiment includes coupling the test apparatus 136 to the spindle 114 at axially spaced locations along an outer surface of the spindle 114. Removably coupling may also include providing a first annular member 138 and a second annular member 140, and providing a resilient sleeve 142. Further, removably coupling includes assembling the first and second annular members 138, 140 and the sleeve 142 over the spindle 114 such that the first and second annular members are radially displaced from the spindle 114 further than the resilient sleeve 142 and axial distance is reduced between first and second annular members 138, 140 such that radial portions of the first and second annular members 138, 140 exert force on axially spaced portions of the resilient sleeve 142 to couple the sleeve 142 to the spindle 114.

Further, in one embodiment, reducing the axial distance between the first and second annular members 138, 140 includes manipulating first and second threadably engaged surfaces to bring the first and second annular members 138, 140 closer to one another.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the test apparatus while maintaining substantially the same functionality without departing from the scope and spirit of the present invention.

What is claimed is:

1. A method of testing a spindle used to support a disc pack for rotation in a disc drive, the method comprising the steps of:

removably coupling a test apparatus to the spindle, the test apparatus defining a test surface and having an outer periphery greater than an outer periphery of the spindle;

placing a measurement device proximate the test surface at a location radially spaced from the outer periphery of the spindle; and measuring a distance between the test surface and the measurement device with the measurement device during rotation of the spindle and the test apparatus.

2. The method of claim 1 and further comprising:

sorting a plurality of spindles based upon distances measured.

3. The method of claim 1 wherein measuring comprises:

measuring the distance between the test surface and the measurement device at various frequencies of rotation of the spindle; and recording the distances measured, and the frequencies associated with those distances.

4. The method of claim 1 wherein removably coupling the test apparatus comprises:

removably coupling the test apparatus to the spindle at axially spaced locations along an outer surface of the spindle.

5. The method of claim 4 wherein removably coupling comprises:

providing a first annular member;

providing a second annular member;

providing a resilient sleeve;

assembling the first and second annular members and the sleeve over the spindle such that the first and second annular members are radially displaced from the spindle further than the resilient sleeve; and reducing an axial distance between the first and second annular members such that radial inner portions of the first and second annular members exert a force on axially spaced portions of the resilient sleeve to couple the sleeve to the spindle.

6. The method of claim 5 wherein the first annular member has a threaded surface, and the second annular member has a threaded surface threadably mated with the surface of the first annular member, and wherein reducing the axial distance comprises:

rotating one of the first and second annular members relative to the other such that the threaded surfaces engage one another to reduce the axial distance between the first and second annular members.

7. The method of claim 1 wherein the spindle has an annular flange, and wherein removably coupling comprises:

coupling the test apparatus to the spindle in abutting relation to the annular flange.

8. A system for testing a spindle used to support a disc pack for rotation in a disc drive, the system comprising:

a first generally annular member;

a second generally annular member removably coupled to the first generally annular member, the first and second generally annular members defining a bore;

a resilient sleeve, sized to fit in the bore and to receive the spindle therein, one of the first and second annular members defining a test surface and the first and second generally annular members having sleeve contacting portions configured to exert an increasing force on the sleeve as the first and second annular members are brought axially closer to one another; and a measurement device positioned proximate the test surface at a position radially displaced outwardly from the outer periphery of the spindle.

* * * * *